(12) United States Patent
Moriwaki et al.

(10) Patent No.: US 7,121,667 B2
(45) Date of Patent: Oct. 17, 2006

(54) GEOMETRICALLY CORRECTING METHOD AND SYSTEM FOR IMAGE DISTORTION WITH THE AID OF AN AUXILIARY LINE

(75) Inventors: Daisuke Moriwaki, Tokyo (JP); Yoshiharu Komatsu, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 228 days.

(21) Appl. No.: 10/824,545

(22) Filed: Apr. 15, 2004

(65) Prior Publication Data

US 2004/0207819 A1 Oct. 21, 2004

(30) Foreign Application Priority Data

Apr. 18, 2003 (JP) ............................. 2003-114957

(51) Int. Cl.
G03B 21/26 (2006.01)
G03B 21/14 (2006.01)
G03B 21/00 (2006.01)

(52) U.S. Cl. ........................... 353/30; 353/70; 353/121
(58) Field of Classification Search ................. 353/30, 353/69, 70, 121; 434/285; 345/6
See application file for complete search history.

(56) References Cited

U.S. PATENT DOCUMENTS

| | | | |
|---|---|---|---|
| 6,733,138 B1 * | 5/2004 | Raskar | 353/94 |
| 6,793,350 B1 * | 9/2004 | Raskar et al. | 353/121 |
| 6,811,264 B1 * | 11/2004 | Raskar et al. | 353/94 |
| 6,877,864 B1 * | 4/2005 | Tamura et al. | 353/70 |
| 2002/0009699 A1 | 1/2002 | Hyodo et al. | 434/285 |
| 2003/0011535 A1 | 1/2003 | Kikuchi et al. | 345/6 |

FOREIGN PATENT DOCUMENTS

| | | |
|---|---|---|
| JP | 2002-014611 A | 1/2002 |
| JP | 2003-085586 A | 3/2003 |

* cited by examiner

*Primary Examiner*—Melissa Jan Koval
(74) *Attorney, Agent, or Firm*—Foley & Lardner LLP

(57) ABSTRACT

An auxiliary line created on a computer is displayed on a user interface screen, and is projected onto a curved screen by a projector. The user adjusts real numbers substituted into variables of an approximate expression held in the computer for drawing auxiliary line to transform the auxiliary line drawn on the user interface screen for a correction such that the auxiliary line in the image projected from the projector through a video cable approaches to a straight line. If this correction causes the auxiliary line to extend beyond the screen of a display, the computer scales down the current user interface screen, and creates a virtual correction area therearound, so that the auxiliary line can be fully displayed within the screen.

15 Claims, 8 Drawing Sheets

A CYLINDRICAL SCREEN

A SCREEN EXTENDING OVER TWO WALLS INCLUDING A CORNER THEREBETWEEN

A SPHERICAL SCREEN

A CONCAVE SCREEN

ARROWS DRAWN IN THE FIGURES INDICATE DIRECTION IN WHICH THE PROJECTOR PROJECTS AN IMAGE

Fig. 8

A SINUSOIDAL
WAVE SCREEN

A SCREEN INCLUDING WALLS
OF A RECTANGULAR SOLID
INCLUDING CORNERS
THEREBETWEEN

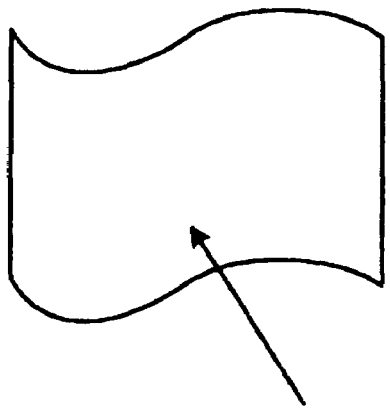
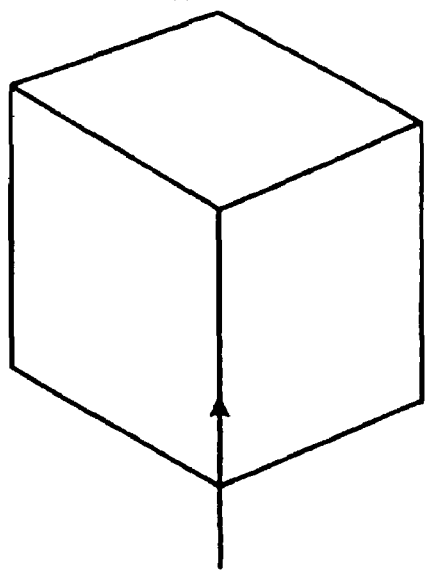

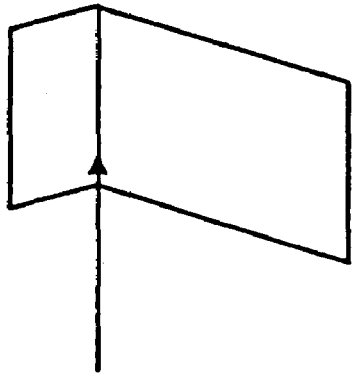
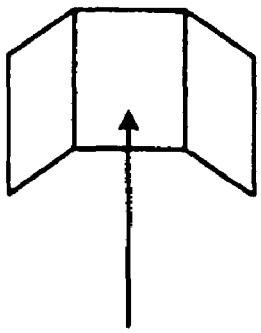

A SCREEN EXTENDING OVER
TWO WALLS INCLUDING A
CORNER THEREBETWEEN
WITH THE LEFT WALL AND
RIGHT WALL BEING IN A
DIFFERENT PROPORTION

A WALL – SHAPED SCREEN
HAVING CORNERS ON THE
LEFT AND RIGHT SIDES

ARROWS DRAWN IN THE FIGURES
INDICATE DIRECTION IN WHICH THE
PROJECTOR PROJECTS AN IMAGE

GEOMETRICALLY CORRECTING METHOD AND SYSTEM FOR IMAGE DISTORTION WITH THE AID OF AN AUXILIARY LINE

BACKGROUND OF THE INVENTION

1. Field of the Invention

The present invention relates to a method and system for correcting an image distortion occurring when an original image as captured or created is projected on a screen.

2. Description of the Related Art

Due to a difference between a projecting method used to capture or create an original image and a projecting method used to project the original image in a planetarium, or when the image is projected onto a spherical screen, the image suffers from distortion. To reduce or eliminate this distortion of the projected image, JP-2002-14611 discloses a video projecting method which converts each pixel position on an original image to a position at which a projected image is less distorted or free from distortion to sequentially generate post-conversion pixel position data, sequentially generates projection image data for each frame after the pixel position conversion from input projection image data and post-conversion image position data, and emits a projected image from an output device, thereby correcting each pixel position on the original image when it was created to project the correct image.

A means proposed for correcting such distortion of a projected image may project an auxiliary line from a projector onto a curved screen as a test pattern, and manipulate the auxiliary line displayed on a user interface display area on a display of a personal computer, while viewing the image of the projected auxiliary line.

FIGS. 1 and 2 illustrate an example of correcting distortion of a projected image when it is projected onto cylindrically curved screen 11 by projector 12, wherein predetermined auxiliary line 14 is drawn on user interface screen 13a on a display of computer 18, and auxiliary line 14 is transformed on a display area defined for user interface screen 13a, on which auxiliary line 14 is displayed, to correct distortion of the projected image. Line 16 illustrates the connection between the computer 18 and the projector 12. FIG. 1 illustrates the image before the correction for distortion, while FIG. 2 illustrates the image after the correction for distortion.

First, as illustrated in FIG. 1, a rectangle, for example, is displayed with straight auxiliary line 14 on the display area defined for user interface screen 13a. Auxiliary line 14 is projected onto cylindrically curved screen 11 from projector 12 through video cable 17. The auxiliary line projected onto curved screen 11 appears to be a distorted image due to the curved shape of screen 11, rather than a rectangle composed of straight line segments, so that auxiliary line 14 displayed on the display area for user interface screen 13a is transformed or modified as illustrated in FIG. 2. Transformed auxiliary line 14 thus transformed is projected onto cylindrically curved screen 11 from projector 12 through video cable 17 to adjust the transformation of auxiliary line 14 on user interface screen 13a on display 13 such that the projected image of the auxiliary line approaches to a rectangle composed of straight line segments.

Then, when auxiliary line 14 projected onto curved screen 11 fits to a rectangle composed of straight line segments, variables corresponding to transformed auxiliary line 14 at this time are saved as correction data. By correcting image data projected from projector 12 using the correction data, a projected image can be geometrically corrected to display the projected image which has been corrected for distortion on curved screen 11.

The foregoing distortion correcting technique using auxiliary line 14 can experience auxiliary line 14 extending out of the display area for user interface screen 13a as illustrated in FIG. 3 when a correction should be made beyond the display area for user interface screen 13a, or when the display of computer 18 has a resolution lower than that of projector 12. In this event, a problem arises in that the behavior of auxiliary line 14 cannot be confirmed out of the screen.

Since a general-purpose personal computer is often used as computer 18, the resolution of projector 12 is not always the same as the resolution of the display associated with such a personal computer on which the user interface screen is displayed. For this reason, when projector 12 has a higher resolution than that of the display of the personal computer, auxiliary line 14 must be corrected over an area beyond the display of the personal computer, causing auxiliary line 14 to extend out of the display area for user interface screen 13a. This would result in a failure in drawing auxiliary line 14 within the display area for user interface screen 13a, thereby making the correction for distortion more difficult.

SUMMARY OF THE INVENTION

It is an object of the present invention to provide a distortion correcting method and system which are capable of facilitating a geometrical correction of a distorted auxiliary line projected onto a screen by a projector, which correction is made on a user interface screen displayed on a display of a personal computer, independently of the resolutions of the projector and the display.

A method of geometrically correcting an image for distortion with the aid of an auxiliary line according to the present invention is adapted for a geometrical correction with the aid of an auxiliary line on a user interface screen, characterized in that a display area for the user interface screen is virtually displayed on a reduced scale through an application on a computer to define a virtual correction area therearound, so that a correction can be made for the auxiliary line which extends beyond the display area, and a correction can be made using the auxiliary line even when a used display has a resolution lower than that of the projector.

In another aspect, a system for geometrically correcting a projected image for distortion according to the present invention includes a computer operated under the control of a program, a display connected to the computer for displaying a user interface screen thereon, a projector for projecting an image, and a screen for displaying thereon a video image emitted from the projector. An auxiliary line drawn by the computer is displayed on the display, and also projected onto the screen through the projector. The auxiliary line displayed on the screen is corrected for distortion by a predetermined transformation made by the computer to the auxiliary line displayed on the display. The system is characterized in that the computer has a function of virtually displaying a display area for the user interface screen on a reduced scale, and creating a virtual correction area therearound.

The computer also has a function of displaying the auxiliary line on a reduced scale which may be implemented by a means for reducing the display area for the user interface screen upon detecting that the auxiliary line drawn on the display extends beyond the display area for the user interface screen on the display, and creating a virtual correction area therearound.

The computer further has a function of transforming the auxiliary line displayed on the display which may be implemented by a processing means for transforming the auxiliary line with a previously set approximate expression for correcting a projected image for distortion associated with the shape of the projection surface of the screen, and with a variable value applied to transform the approximate expression, wherein the projector may include an image processing function for transforming the auxiliary line emitted from the projector based on the result of the processing performed by the computer to project the transformed auxiliary line.

The approximate expression for use in the correction may be, for example, an approximate equation of parabola for the horizontal direction of a cylindrical screen when it is employed; an approximate equation of parabola for the vertical and horizontal directions of a spherical projection surface when it is employed; an approximate equation of a straight line when an employed projection surface has flat walls with a corner therebetween; and a trigonometric function when an employed screen has a sinusoidally waved projection surface.

BRIEF DESCRIPTION OF THE DRAWINGS

FIG. 8 is a schematic diagram illustrating another example of a screen to which the present invention can be applied.

DETAILED DESCRIPTION OF THE PREFERRED EMBODIMENTS

Figure 4:
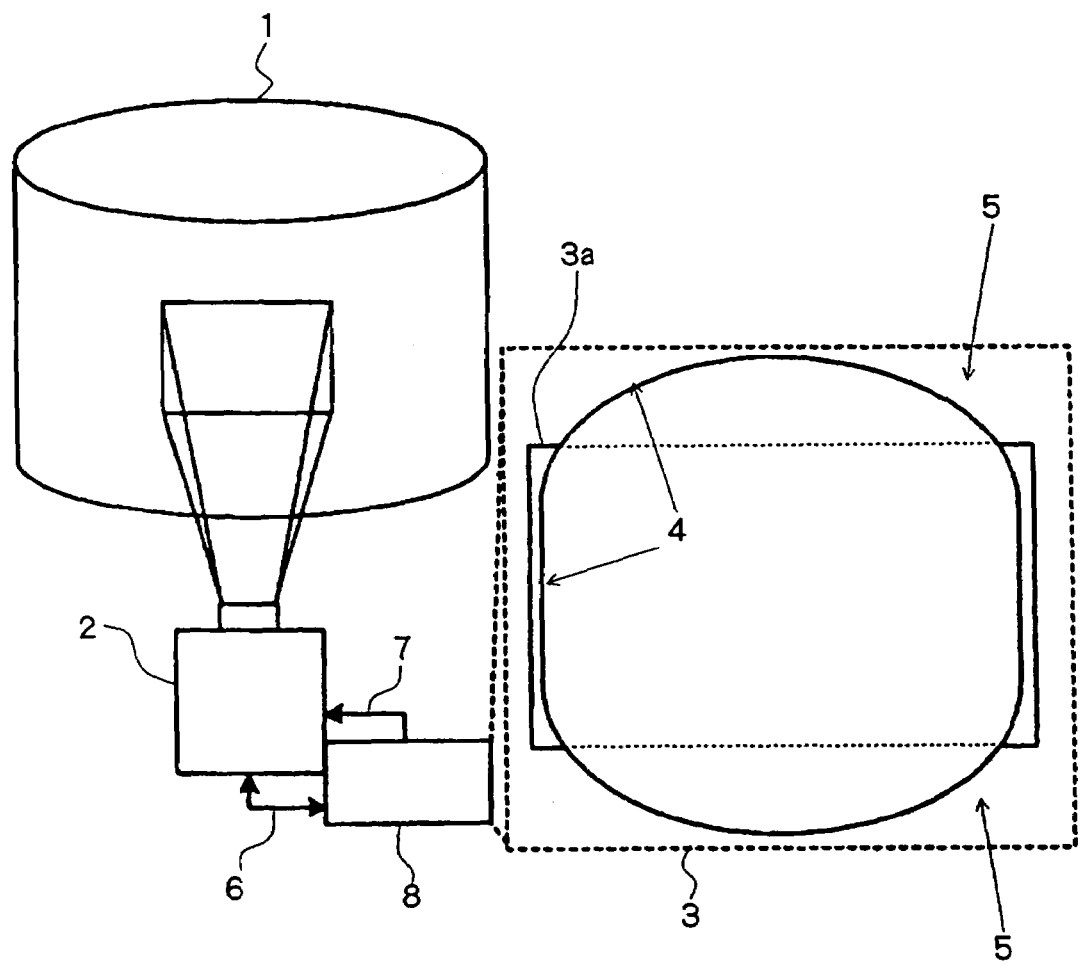
FIG. 4 is a schematic diagram generally illustrating a method of geometrically correcting a projected image for distortion with the aid of an auxiliary line according to one embodiment of the present invention.

FIG. 4 is a schematic diagram generally illustrating a method of geometrically correcting a projected image for distortion with the aid of an auxiliary line according to one embodiment of the present invention. An illustrated system comprises curved screen 1; projector 2 for projecting an image; computer 8 for operational processing; and display 3 connected to computer 8 for displaying user interface screen 3a thereon.

Curved screen 1 is shown as a cylindrically curved surface in FIG. 4, but the present invention can be directed to a screen which does not have a simple planar shape and therefore requires some geometrical correction, such as a spherical surface, walls with a corner therebetween, a curtain, and the like.

Projector 2 and computer 8 are interconnected through communication cable 6 which enables bi-directional communications therebetween or a one-way communication from computer 8 to projector 2 for communicating information. Projector 2 and computer 8 are also interconnected through video cable 7, such that a video image created by computer 8 and displayed on display 3 can be projected onto curved screen 1 by projector 2.

Figure 5:
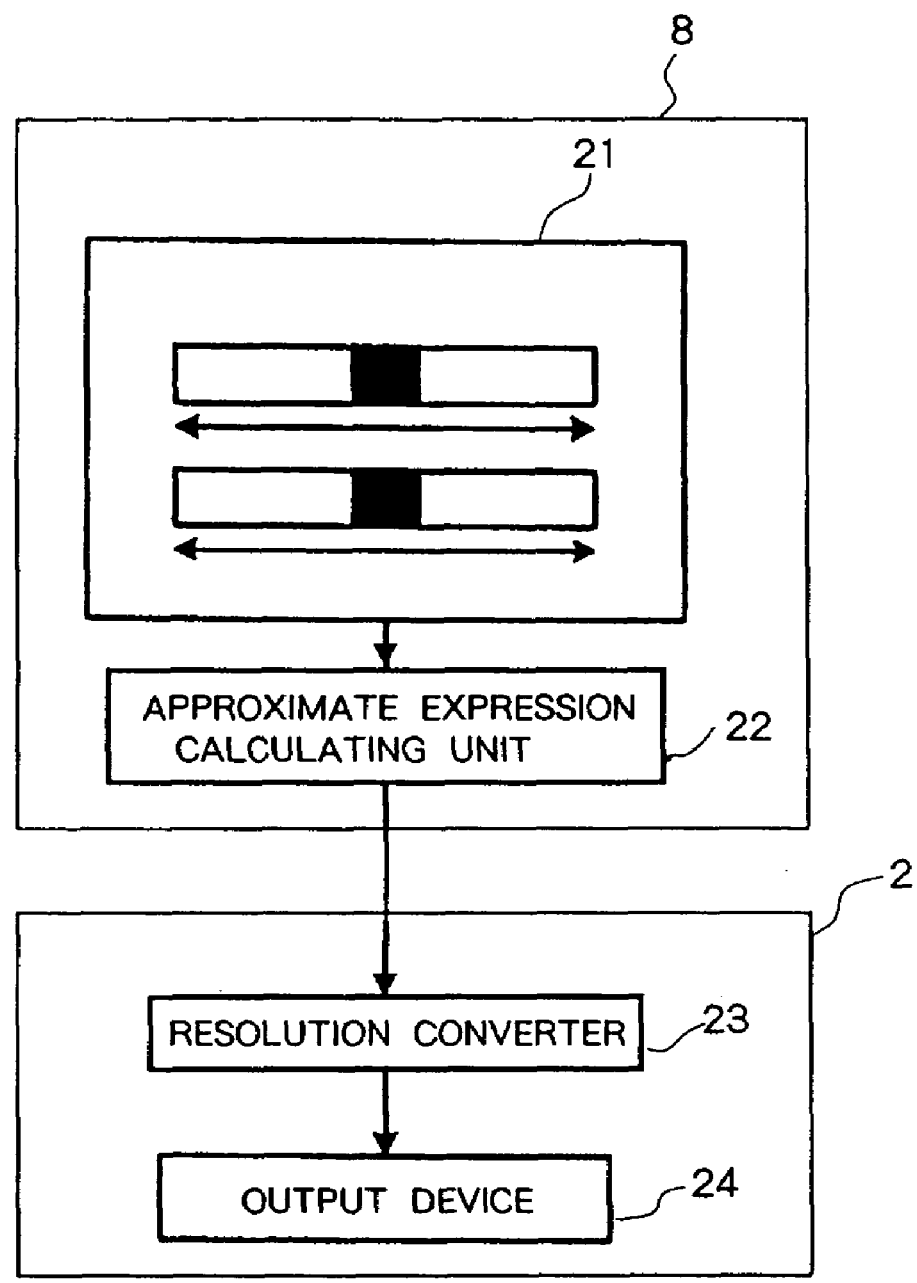
FIG. 5 is a block diagram illustrating an exemplary configuration of a computer and a projector in the embodiment of FIG. 4.

FIG. 5 is a block diagram illustrating an exemplary configuration of computer 8 and projector 2. Computer 8 comprises simple input means 21 such as a slide bar; and approximate expression calculating unit 22 which receives input values from input means 21 to calculate values for transformation using an approximate expression held therein. Projector 2 in turn includes resolution converter 23 for image processing which is capable of scaling up or down an image; and an output device 24 for projecting the result of transformation.

When the slide bar is manipulated by the user to move left or right, input means 21 responsively sets variables to values required for geometrical correction depending on a location to which input means 21 has been moved. Approximate expression calculating unit 22 holds an approximate expression for correcting distortion when an image is projected onto curved screen 1, for example, equation of parabola for a cylindrically curved screen.

Approximate expression calculating unit 22 substitutes values applied from input means 21 into variables in the approximate equation for correcting distortion, held therein, to calculate values for transformation of a shape and deliver a shape resulting from the correction, as well as resulting values. Resolution converter 23, which is capable of scaling up or down an image, scales up or down the rectangular image based on the input from approximate expression calculating unit 22 to make a transformation conforming to the approximate expression. Output device 24 projects the result of the transformation made by resolution converter 23 onto the screen.

Computer 8 also comprises a means for displaying auxiliary line 4 on user interface screen 3a. Upon receipt of data from input means 21, a parabola, a straight line, or the like is displayed on the screen as auxiliary line 4 for visually supporting the geometrical correction. The image including auxiliary line 4 displayed on display 3 is projected onto curved screen 1 by projector 2 through video cable 7, so that the operator makes a correction by transforming auxiliary line 4 on display 3 in the horizontal and/or vertical direction, while viewing the auxiliary line on the projected image to reflect the result of the correction to the image projected by projector 2.

Computer 8 further comprises a means for communicating with projector 2 through communication cable 6 to capture information on the resolution of projector 2 from projector 2. In addition, computer 8 also comprises a means which permits the operator to select or enter an arbitrary resolution through a user interface to scale up or down user interface screen 3a.

Figure 6:
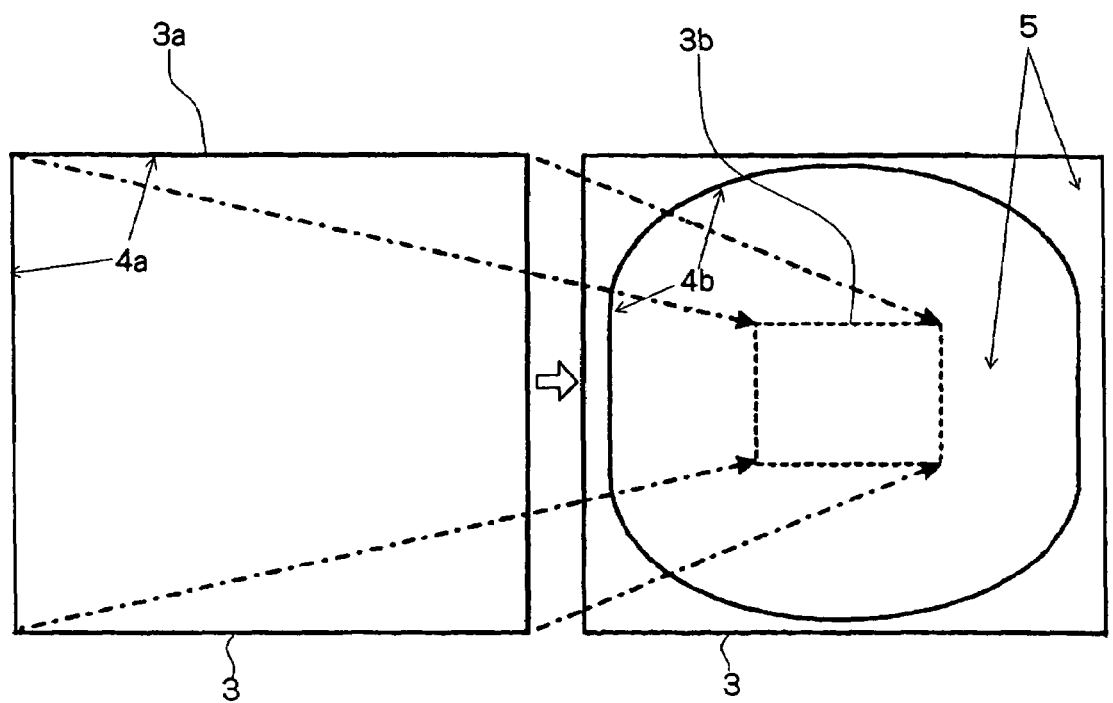
FIG. 6 is a schematic diagram for describing the operation of the embodiment.

FIG. 6 is a schematic diagram for describing the operation for scaling down the display area of user interface screen 3a in the foregoing embodiment. In the following, the operation of this embodiment will be described with reference to FIGS. 4 to 6. As can be seen, the configuration of the system illustrated in FIG. 4 basically conforms to that of the conventional system illustrated in FIGS. 1 and 2.

Prior to a correcting operation, computer 8 captures information on the resolution of projector 2 from projector 2, or receives resolution information selected by the user. Subsequently, computer 8 draws user interface screen 3a in a one-to-one relationship to the resolution in accordance with the resolution information. As user interface screen 3a has been drawn, a correction can be started.

Figure 1:
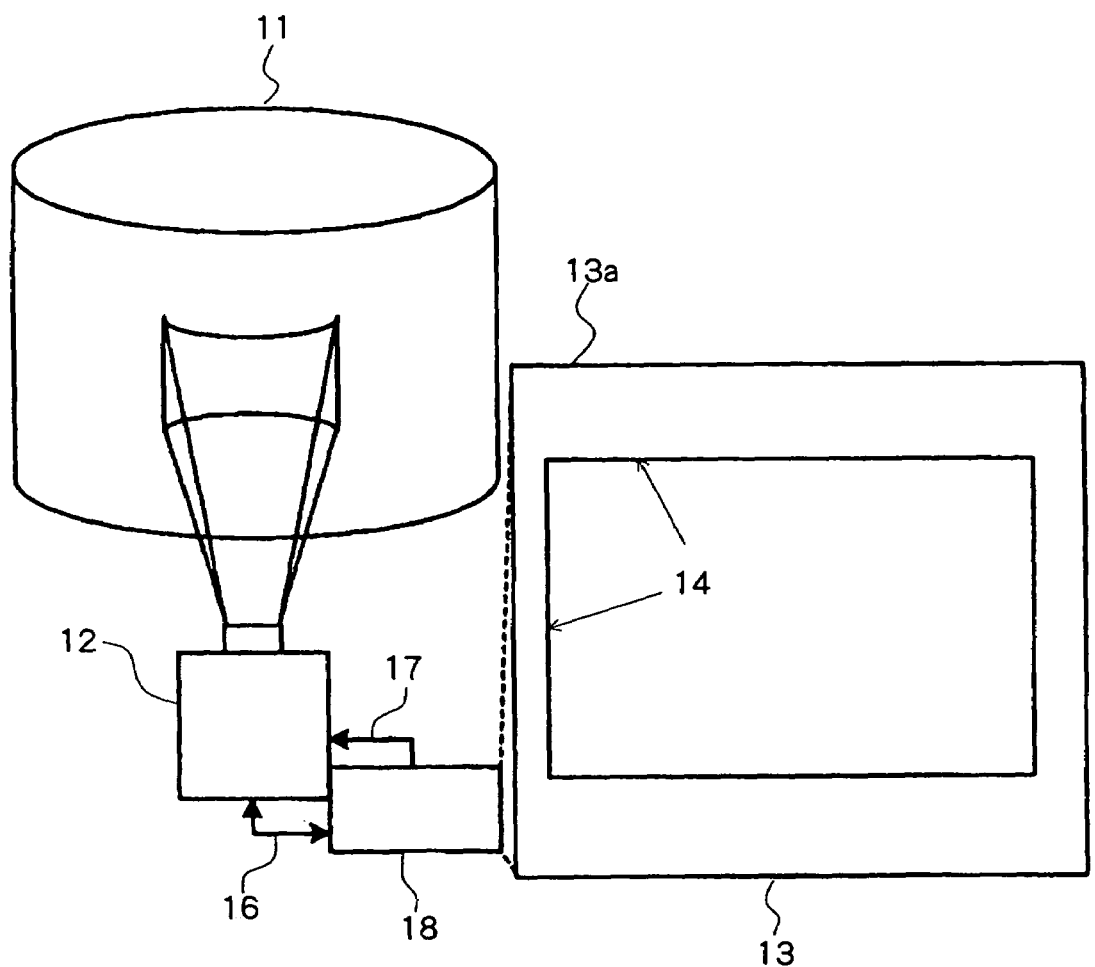
FIGS. 1 to 3 are explanatory diagrams illustrating an exemplary conventional method of geometrically correcting a projected image for distortion with the aid of an auxiliary line, to which the present invention is applied.
Figure 2:
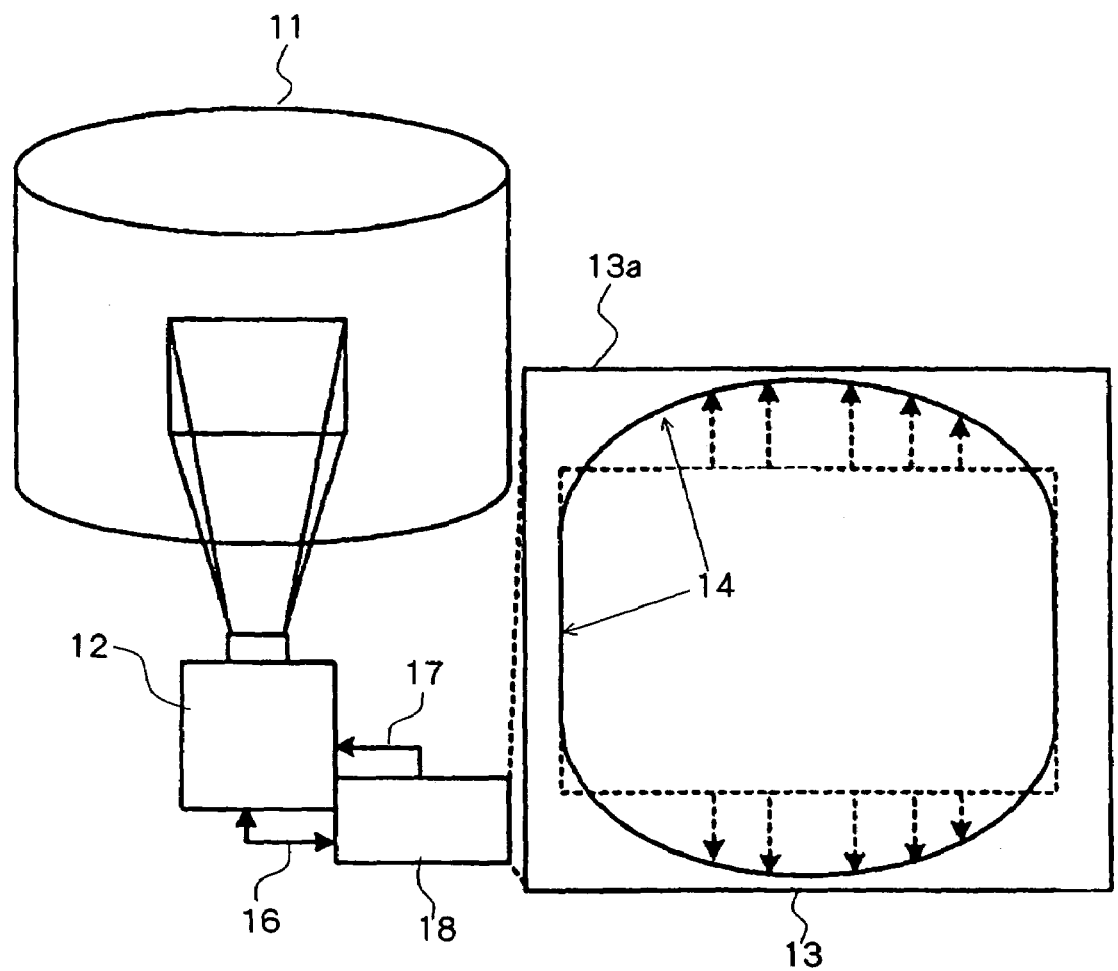
Figure 3:
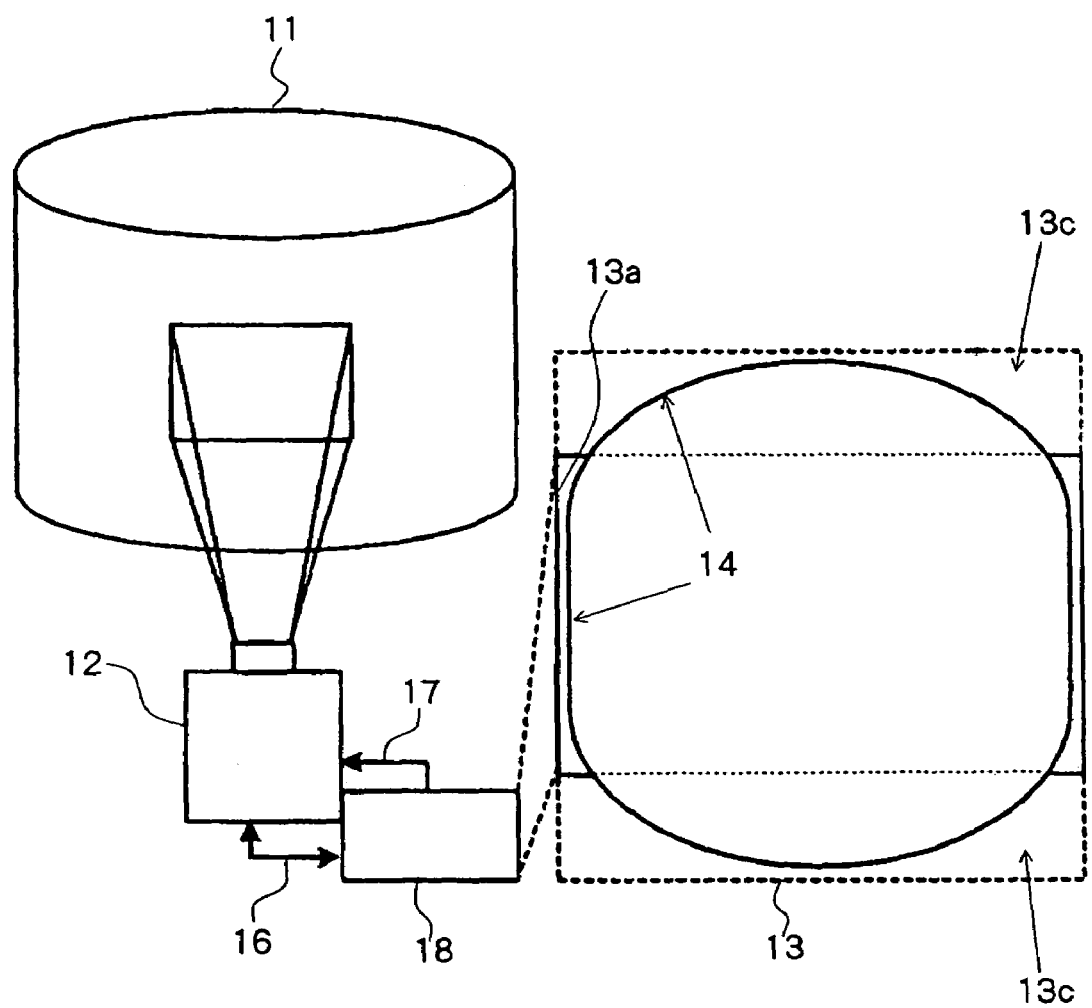

Auxiliary line 4 in the form of a rectangle, for example, created on computer 8 is displayed on user interface screen 3*a*, and also projected onto curved screen 1 by projector 2. The auxiliary line projected on screen 1, however, does not appear as a rectangle but has upper and lower sides parabolically concaved as illustrated in FIG. 1. The user manipulates input means 21 to adjust real numbers to be substituted into variables of the approximate expression (here, an equation of parabola) held in computer 8 to parabolically inflate the upper and lower sides of auxiliary line 4 displayed on user interface screen 3*a*.

With this adjustment, auxiliary line 4 drawn on user interface screen 3*a* is transformed, and simultaneously projected onto curved screen 1 by projector 2 through video cable 7, and a geometrical correction is made through video cable 7 to attempt to fit the auxiliary line in the image projected from projector 2 more to a straight line.

By changing real numbers to be substituted into the variables of the approximate expression (here, an equation of parabola) held in computer 8 for drawing auxiliary line 4, it is possible to correct an image for distortion when it is projected onto a variety of curved screens having different radii of curvature from one another. In this event, manipulations for transforming auxiliary line 4 can be carried out through a simple interface such as a slide bar as illustrated in FIG. 5.

In course of a correction of auxiliary line 4 on user interface screen 3*a*, if a correction made by the user spreads beyond the area of current user interface screen 3*a* to cause auxiliary line 4 to extend out of the screen of display 3 as illustrated in the left-hand figure of FIG. 6, resulting auxiliary line 4*a* will overlie on the outer peripheral line of the screen of display 3. In this event, as illustrated in the right-hand figure of FIG. 6, current user interface screen 3*a* is scaled down to reduced user interface screen 3*b*, and virtual correction area 5 may be created on the screen of display 3 around reduced user interface screen 3*b*, so that auxiliary line 4*a*, which has extended beyond the screen, can be displayed as auxiliary line 4*b*.

When display 3 connected to computer 8 has a resolution lower than that of projector 2, the current user interface screen may be scaled down likewise corresponding to the resolution, and virtual correction area 5 is defined around the reduced user interface screen. In this way, a user-friendly geometrical correction can be carried out independently of the resolutions of projector 2 and display 3.

In the foregoing embodiment described above, while the user interface screen is scaled up or down in response to the user's will, computer 8 can automatically scale up or down user interface screen 3*a*.

For example, when a manipulation of input means 21 such as a slide bar shown in FIG. 5 causes a correction range for auxiliary line 4 to spread beyond the current user interface screen, computer 8 detects this situation, and automatically controls the resolution to scale down the size of the interface screen to create virtual correction area 5. On the other hand, when the correction range falls within the user interface screen, computer 8 detects this situation, and automatically controls the resolution to return the user interface screen to the original size.

Alternatively, upon activation of a software program for geometrically correcting a projected image, computer 8 may capture information on the resolution of projector 2 from projector 2, and automatically determine an appropriate size for the user interface screen including a virtual correction area, suitable for the resolution. In this event, the user interface may be left for manually scaling up or down the user interface screen, so that the user can scale up or down the user interface screen at his discretion even after the automatic setting.

Figure 7:
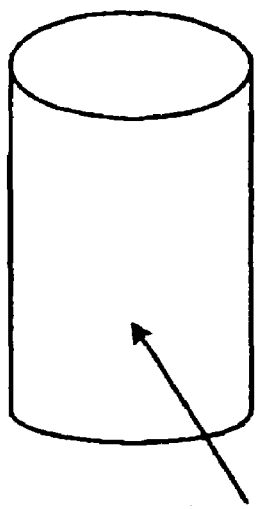
FIG. 7 is a schematic diagram illustrating an example of a screen to which the present invention can be applied.
Figure 7:
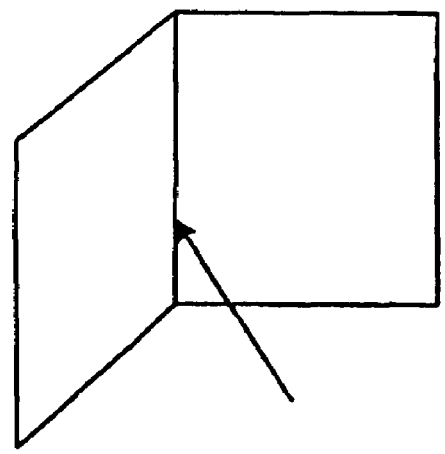
Figure 7:
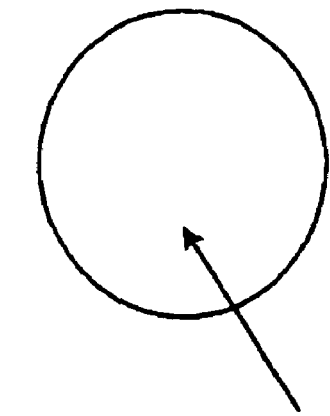
Figure 7:
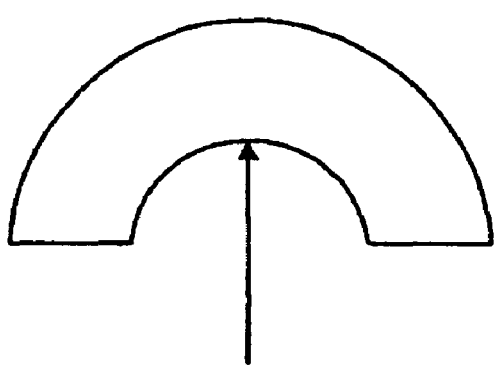

FIGS. 7, 8 illustrate other exemplary screens to which the present invention can be applied. Arrows drawn in the figures indicate directions in which the projector projects an image. While the foregoing embodiment employs a cylindrical screen as projection screen 1, a screen directed by the present invention may be a screen in any shape, such as a spherical screen, a screen extending over two walls including a corner therebetween, a concave screen as illustrated in FIG. 7, or a sinusoidally waved screen, a screen extending over two walls including a corner therebetween with the left wall and right wall being in a different proportion, a screen including walls of a rectangular solid including corners therebetween, a wall-shaped screen having corners on the left and right sides, and the like, as illustrated in FIG. 8.

In this event, a correction may be made using an approximate equation as mentioned above by changing variables included therein. For example, with a concave screen, a correction can be made by setting an approximate equation which has characteristics opposite to those of a convex screen. With a screen composed of flat walls with a corner therebetween, a correction can be made using an equation of a straight line as an approximate equation. With a sinusoidally waved screen, a correction can be made by setting a trigonometric function as an approximate expression.

While the foregoing embodiment has been described in connection with a transformation of the auxiliary line using an approximate equation which corresponds to a curved shape of a projection screen, the present invention can be applied to any device which comprises a memory for storing data on a proper auxiliary line such as a straight line or a circle, reads the auxiliary line from the memory for drawing on a user interface screen as well as for projection on a screen by a projector, transforms the auxiliary line drawn in the user interface screen if the auxiliary line projected onto the screen is distorted, adjusts the transformation such that the projected auxiliary line can be fitted to a desired auxiliary line such as a straight line or a circle, by way of example.

The system according to the present invention can scale up or down the user interface screen in accordance with resolution information acquired from the projector, and can also scale up or down the user interface screen in accordance with resolution information selected or entered by the user, thus facilitating a geometrical correction using the auxiliary line independently of the resolutions of the projector and display.

What is claimed is:

1. A geometrical image distortion correcting method with the aid of an auxiliary line for geometrically transforming the auxiliary line in a predetermined shape displayed on a display screen of a computer to correct the auxiliary line such that a projected image of the auxiliary line when projected from a projector to a screen fits the auxiliary line in the predetermined shape, said method comprising the steps of:

virtually displaying a display area for a user interface screen within the display screen on a reduced scale using an application on the computer to define a virtual correction area around said display area displayed on the reduced scale; and geometrically transforming said auxiliary line in said virtual correction area as well.

2. The geometrical image distortion correcting method with the aid of an auxiliary line according to claim 1, further comprising the step of:

determining the display area for the user interface screen within the display screen displayed on the reduced scale in association with the resolution of said projector.

3. The geometrical image distortion correcting method with the aid of an auxiliary line according to claim 1, further comprising the step of:

displaying said display area on a reduced scale through a predetermined manipulation when the auxiliary line drawn on the display area for the user interface screen within said display screen extends beyond said display area.

4. A system for geometrically correcting a projected image for distortion, comprising:

a computer operated under the control of a program;

a display connected to said computer for displaying a user interface screen;

a projector for projecting an image; and a screen on which a projected image emitted from said projector is displayed, wherein an auxiliary line drawn by said computer is displayed on said display, and projected onto said screen through said projector, and the auxiliary line projected onto said screen is corrected for distortion through a predetermined transformation on the auxiliary line displayed on said display, said computer comprising a function of virtually reducing a display area for said user interface screen on said display, and creating a virtual correction area capable of displaying said auxiliary line around the reduced display area.

5. The system for geometrically correcting a projected image for distortion according to claim 4, wherein said computer further comprises a function of determining the display area for said user interface screen corresponding to a specified resolution.

6. The system for geometrically correcting a projected image for distortion according to claim 4, wherein said computer further comprises a function of determining the display area for said user interface screen corresponding to the resolution of said projector.

7. The system for geometrically correcting a projected image for distortion according to claim 4, wherein said computer further comprises a function of reducing the display area for said user interface screen upon detecting that the auxiliary line drawn in said display extends beyond the display area for said user interface screen on said display, and creating a virtual correction area around the reduced display area.

8. The system for geometrically correcting a projected image for distortion according to claim 5, wherein said computer further comprises a function of reducing the display area for said user interface screen upon detecting that the auxiliary line drawn in said display extends beyond the display area for said user interface screen on said display, and creating a virtual correction area around the reduced display area.

9. The system for geometrically correcting a projected image for distortion according to claim 6, wherein said computer further comprises a function of reducing the display area for said user interface screen upon detecting that the auxiliary line drawn in said display extends beyond the display area for said user interface screen on said display, and creating a virtual correction area around the reduced display area.

10. The system for geometrically correcting a projected image for distortion according to claim 4, wherein:

said computer further comprises a processing function for geometrically transforming the auxiliary line with an approximate expression previously set to correct the projected image for distortion associated with the shape of a projection surface of said screen, and with a variable applied to transform said approximate equation; and said projector comprises an image processing function for transforming the auxiliary line delivered from said projector based on the result of processing performed by said computer to project the transformed auxiliary line.

11. The system for geometrically correcting a projected image for distortion according to claim 5, wherein:

said computer further comprises a processing function for geometrically transforming the auxiliary line with an approximate expression previously set to correct the projected image for distortion associated with the shape of a projection surface of said screen, and with a variable applied to transform said approximate equation; and said projector comprises an image processing function for transforming the auxiliary line delivered from said projector based on the result of processing performed by said computer to project the transformed auxiliary line.

12. The system for geometrically correcting a projected image for distortion according to claim 6, wherein:

said computer further comprises a processing function for geometrically transforming the auxiliary line with an approximate expression previously set to correct the projected image for distortion associated with the shape of a projection surface of said screen, and with a variable applied to transform said approximate equation; and said projector comprises an image processing function for transforming the auxiliary line delivered from said projector based on the result of processing performed by said computer to project the transformed auxiliary line.

13. The system for geometrically correcting a projected image for distortion according to claim 7, wherein:

said computer further comprises a processing function for geometrically transforming the auxiliary line with an approximate expression previously set to correct the projected image for distortion associated with the shape of a projection surface of said screen, and with a variable applied to transform said approximate equation; and said projector comprises an image processing function for transforming the auxiliary line delivered from said projector based on the result of processing performed by said computer to project the transformed auxiliary line.

14. The system for geometrically correcting a projected image for distortion according to claim 8, wherein:

said computer further comprises a processing function for geometrically transforming the auxiliary line with an approximate expression previously set to correct the projected image for distortion associated with the shape of a projection surface of said screen, and with a variable applied to transform said approximate equation; and said projector comprises an image processing function for transforming the auxiliary line delivered from said projector based on the result of processing performed by said computer to project the transformed auxiliary line.

15. The system for geometrically correcting a projected image for distortion according to claim 9, wherein:

said computer further comprises a processing function for geometrically transforming the auxiliary line with an approximate expression previously set to correct the projected image for distortion associated with the shape of a projection surface of said screen, and with a variable applied to transform said approximate equation; and said projector comprises an image processing function for transforming the auxiliary line delivered from said projector based on the result of processing performed by said computer to project the transformed auxiliary line.

* * * * *